(12) United States Patent
Goto

(10) Patent No.: US 7,337,212 B2
(45) Date of Patent: Feb. 26, 2008

(54) COMMUNICATION SYSTEM, COMMUNICATION DEVICE AND COMMUNICATION METHOD

(75) Inventor: Mitsuru Goto, Tokyo (JP)

(73) Assignee: Sony Corporation (JP)

(*) Notice: Subject to any disclaimer, the term of this patent is extended or adjusted under 35 U.S.C. 154(b) by 628 days.

(21) Appl. No.: 09/998,116

(22) Filed: Nov. 30, 2001

(65) Prior Publication Data

US 2002/0083141 A1 Jun. 27, 2002

(30) Foreign Application Priority Data

Dec. 1, 2000 (JP) ............................ P2000-367639

(51) Int. Cl.
*G06F 15/16* (2006.01)
(52) U.S. Cl. .................. 709/206; 709/207; 379/142.01
(58) Field of Classification Search ................ 709/206, 709/207; 379/142.01
See application file for complete search history.

(56) References Cited

U.S. PATENT DOCUMENTS 5,987,508 A * 11/1999 Agraharam et al. ........ 709/217
6,104,711 A * 8/2000 Voit ............................ 370/352
6,731,630 B1 * 5/2004 Schuster et al. ............ 370/356
6,788,769 B1 * 9/2004 Waites ...................... 379/93.24
2002/0016174 A1 * 2/2002 Gibson et al. .............. 455/464

FOREIGN PATENT DOCUMENTS

| WO | 9722211 | 6/1997 |
| WO | 9912365 | 3/1999 |
| WO | 0054488 | 9/2000 |

* cited by examiner

*Primary Examiner*—Bunjob Jaroenchonwanit
*Assistant Examiner*—Duyen Doan
(74) *Attorney, Agent, or Firm*—Lerner, David, Littenberg, Krumholz & Mentlik, LLP

(57) ABSTRACT

A communication system that exchanges electronic mail information based on a mail address including a telephone number of a destination and a domain name of a telecommunication services operator, and that includes a communication device for inputting the telephone number including an operator code and for exchanging the electronic mail information in accordance with the mail address; a storage device which stores a reference table in which the operator code is correlated to the domain name; and a communication management device which uses the operator code as an address to read the domain name of the telecommunication services operator to establish the mail address by combining the telephone number input through the communication device and the domain name read from the storage device.

8 Claims, 10 Drawing Sheets

FIG. 4A
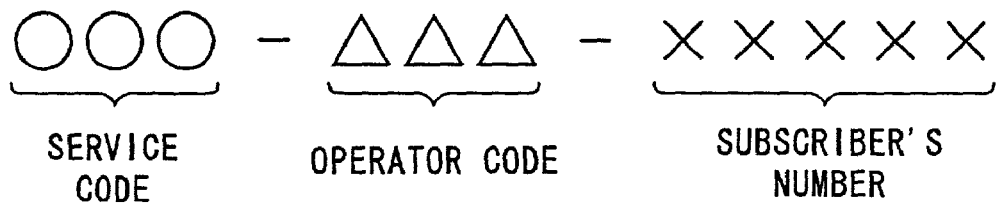
FIG. 4B
MAIL ADDRESS = TELEPHONE NUMBER@DOMAIN NAME
FIG. 5
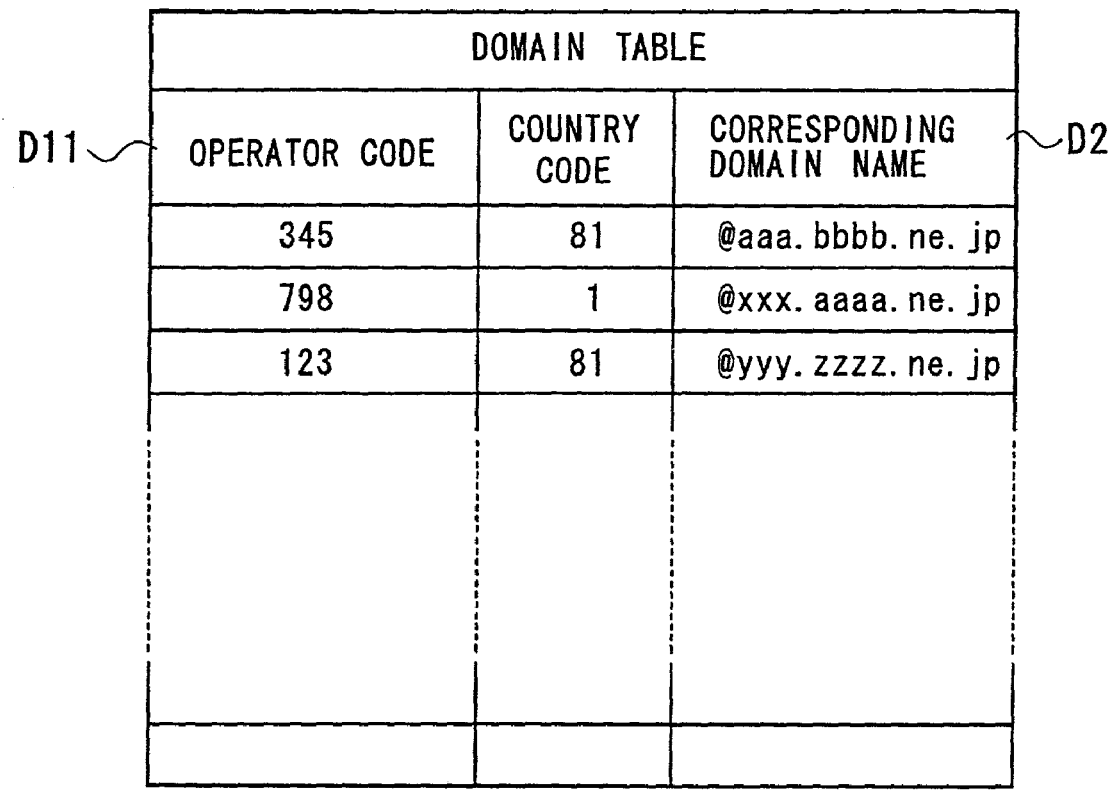

COMMUNICATION SYSTEM, COMMUNICATION DEVICE AND COMMUNICATION METHOD

CROSS REFERENCES TO RELATED APPLICATIONS

The present application claims priority from Japanese Application No. JP 2000-367639, filed in the Japanese Patent Office on Dec. 1, 2000, the disclosure of which is incorporated herein by reference.

BACKGROUND OF THE INVENTION

1. Field of the Invention

The present invention relates to a communication system, a communication device and a communication method preferable for an electronic mail communication system that uses a portable telephone or a personal computer. In particular, the present invention relates to those including a control device which, when transmitting electronic mail information to a destination, reads out domain name information with regard to a telecommunication services operator from a memory storage by using identification number information of the telecommunication services operator as an address, thereby combining the telephone number information input by a user and the domain name information read out from a memory storage to automatically establish a mail address therein, so that input operability of a mail address can be improved in comparison with the conventional method.

2. Description of Related Art

Recently, some cases where electronic mail (e-mail) communication services are used have been increased to send messages to a destination by converting contents which have traditionally been delivered by post-mail into pieces of electronic information. In this kind of service system, electronic mails are transmitted and received among portable telephones, among portable telephones and personal computers (hereinafter, referred to as PC), or among PCs.

In this service system, when transmitting e-mail to a destination, mail information contents and a mail address are inputted into the communication processor in a portable telephone or a PC.

In such a service system, a mail address is usually made up of a telephone number of a destination, an at-mark-symbol "@" and a domain name of a telecommunication services operator. A domain name means in this specification is character and/or symbol information for distinguishing various telecommunication services operators. Based on the mail address, the telecommunication services operator transmits e-mail information to the portable telephones, the PCs and so on of the destination.

Now, the conventional communication service system using electronic mails have the following problems.

(1) When a user transmits an e-mail from his/her portable telephone or his/her personal computer to a portable telephone or a personal computer of a destination, he/she inputs a telephone number of the destination into his/her own device, that is, portable telephone or PC. Further, he/she has to input a domain name component after an at-mark-symbol "@", by inputting Roman characters (alphabets) or symbols.

For example, Japanese Patent Application Laid-Open 2000-148363 discloses a system which uses abbreviated dialing functions for a mail address, which associates an abbreviated number and a mail address. According to this function, with regard to a mail address comprising the telephone number of destination, an at-mark-symbol @ and a domain name of the telecommunication services operator, the user registers the abbreviated number and the mail address in one-to-one correspondence into a memory device in a portable telephone. In transmitting e-mail information, the abbreviated number is used as an address for the purpose of reading out the mail address concerned.

Therefore, from the next time on, the mail address can be read out with the abbreviated number. However, it is necessary for the first time communication to input all the mail address components including the telephone number of the destination, an at-mark-symbol @ and a domain name of the telecommunication services operator, thus causing some troubles of inputting the domain name components after an at-mark-symbol "@".

(2) Additionally, when the domain name of the telecommunication services operator is changed from the registered one, it is necessary for the user to update the registered mail address. That is, when the domain name of the telecommunication services operator is changed, the user must by himself/herself change the memory content in the portable telephone. When the domain name of the telecommunication services operator is changed, it is not possible to transmit e-mail using the telephone number alone without renewing the domain name. However, it is noted that, in a case where the telecommunication services operator of the destination is the same as that of the user, it is possible to transmit e-mail information by inputting the telephone number alone.

SUMMARY OF THE INVENTION

In order to overcome such conventional problems the present invention provides a communication system, a communication device and a communication method, capable of improving the input operability of a mail address when transmitting e-mail information.

According to a first aspect of the present invention, the above-mentioned problem can be overcome by a communication system using electronic mail information on the basis of a mail address including telephone number information of a destination and domain name information of a telecommunication services operator thereof. The communication system comprises a plurality of communication devices through which the telephone number information including identification number information of the telecommunication services operator is inputted, and which communicate with the destination exchanging the electronic mail information in accordance with the mail address; a storage device which stores a reference table in which the identification number information of the telecommunication services operator is corresponded to the domain name information of the telecommunication services operator; a communication management device which uses the identification number information of the telecommunication services operator received from the communication devices as an address and reads out the domain name information of the telecommunication services operator from the storage device; the communication management device combining the communication device telephone number information received from the communication device and the domain name information read out from the storage device thereby establishing the mail address.

According to a second aspect of the present invention, the above-mentioned problem can be overcome by a communication device for exchanging electronic mail information in accordance with a mail address provided with telephone number information of a destination and domain name information of a telecommunication services operator comprising an inputting unit which is operated to input telephone number information including identification number information of the telecommunication services operator; a storage unit which stores a reference table in which the identification number information of the telecommunication services operator is corresponded to the domain name of the telecommunication services operator; and a controller which uses the identification number information of the telecommunication services operator input by the inputting unit as an address to read out the domain name information of the telecommunication services operator from the storage unit, the controller combining the telephone number information input by the inputting unit with the domain name information read out from the storage unit to establish the mail address.

According to a third aspect of the present invention, the above-mentioned problem can be overcome by a communication method of communicating electronic mail information in accordance with an mail address including telephone number information and domain name information of a telecommunication services operator comprising the steps of: producing a reference table beforehand in which identification number information of the telecommunication services operator is corresponded to domain name information of the telecommunication services operator; inputting telephone number information including the identification number information of the telecommunication services operator when transmitting the electronic mail information; using the input identification number information of the telecommunication services operator as an address to read out the domain name information of the telecommunication services operator from the reference table; and combining the input telephone number information with the domain name information read out from the reference table to establish the mail address.

According to the first, second, and third aspect, when communicating electronic mail information on the basis of a mail address including telephone number information of a destination and domain name information of a telecommunication services operator, a storage device storing a reference table in which identification number information of the telecommunication services operator is corresponded to the domain name information of the telecommunication services operator is beforehand prepared. When a user inputs telephone number information including identification number information of the telecommunication services operator into the communication device, the communication management device uses the identification number information as an address, that is, a key for reading out information from the reference table. The domain name information of the telecommunication services operator is read out from the storage device. Then, the communication management device combines the telephone number information received from the communication device and the domain name information read out from the storage device to establish the mail address.

Therefore, the user does not need to one by one input the domain name of the telecommunication services operator in addition to the telephone number information being different from the conventional system. Further the mail address including a telephone number and a domain name is automatically established at the telecommunication services operator end. Thereby, the user has only to input the telephone number information including the identification number information of the telecommunication services operator.

As a result, the user can transmit electronic mail information to a destination. Thus, inputting operability can be improved. Further, an interface function when transmitting an electronic mail can be improved.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 4 is a chart for showing a telephone number system and a configuration example of a mail address;

FIG. 5 shows an example of content of a domain name reference table;

DESCRIPTION OF THE PREFERRED EMBODIMENTS

Aspects of an embodiment of a communication system, a communication apparatus, and a communication method relating to the present invention will be explained, referring to drawings.

(1) Basic Configuration of Embodiments

Figure 1:
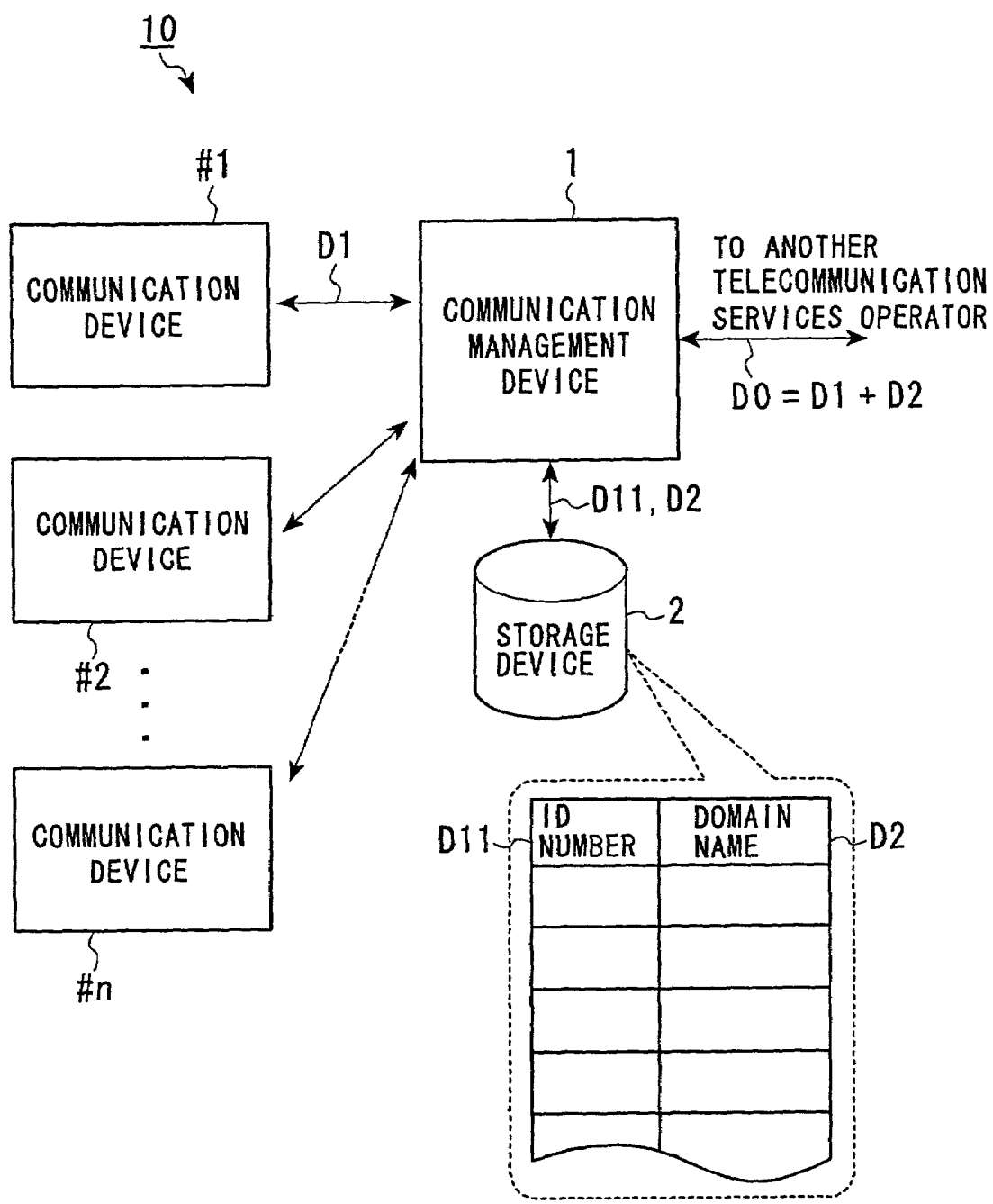
FIG. 1 is a block diagram for showing a configuration example of a communication system 10 as an embodiment of the present invention.

FIG. 1 shows a block diagram illustrating a configuration example of a communication system 10 as a preferred embodiment of the present invention. In this preferred embodiment, when exchanging electronic mail information on the basis of a mail address, a communication management device is provided for the purpose of managing to read out domain name information of a telecommunication services operator, using identification number information of the telecommunication services operator as an address. Herein, the "address" is a clue used for finding domain name information. This communication management device combines the telephone number information received from a communication device and the domain name information read out from a storage device to establish the mail address. Thereby, even when the user do not always input the domain name of the telecommunication services operator in addition to the telephone number of the destination, which is different from a conventional way, the mail address including the telephone number and the domain name can automatically be established. Further, if the user has only to input telephone number including identification number information of a telecommunication services operator, electronic mail information can be transmitted to the destination.

The communication system 10 shown in FIG. 1 exchanges the electronic mail information on the basis of the mail address D0 including telephone number information D1 of a destination and domain name information D2 of the telecommunication services operator. In this communication system 10, the telecommunication services operator end has a communication management device 1. This communication management device 1 manages the mail address D0 of the destination. The Internet gateway server and the like are used for the communication management device 1.

In this system 10, the communication management device 1 of the telecommunication services operator is connected to the communication management device 1 of the other telecommunication services operator(s) by way of a communication network such as the Internet. Then, the electronic mail information is transmitted to the destination communication device to which the communication management device 1 is line-connected.

A storage device 2 is connected to the communication management device 1. A reference table in which the identification number information D11 of the telecommunication services operator is corresponded to the domain name information D2 of the telecommunication services operator is stored in the storage device 2. Each time when the domain name information d2 is changed, the telecommunication services operator renews this reference table. Thereby, a user can have fewer burdens when renewing the domain name information D2.

A plurality of communication devices #i (i=1–n) are prepared at the user end in the system 10. The telephone number information D1 including the identification number D11 of the telecommunication services operator is input, while transmitting the electronic mail information to a destination on the basis of a regular mail address D0 established by the telecommunication services operator. A portable telephone, a portable radio terminal and a personal computer, etc. are used for the communication device #i.

The communication management device 1 manages to read out the domain name information D2 of the telecommunication services operator from the storage device 2, using the identification number information D11 of the telecommunication services operator received from the communication device #i of the user as an address. This communication management device 1 combines the telephone number information D1 received from the communication device #i and the domain name information D2 read out from the storage device 2 to automatically establish the mail address D0.

Figure 2:
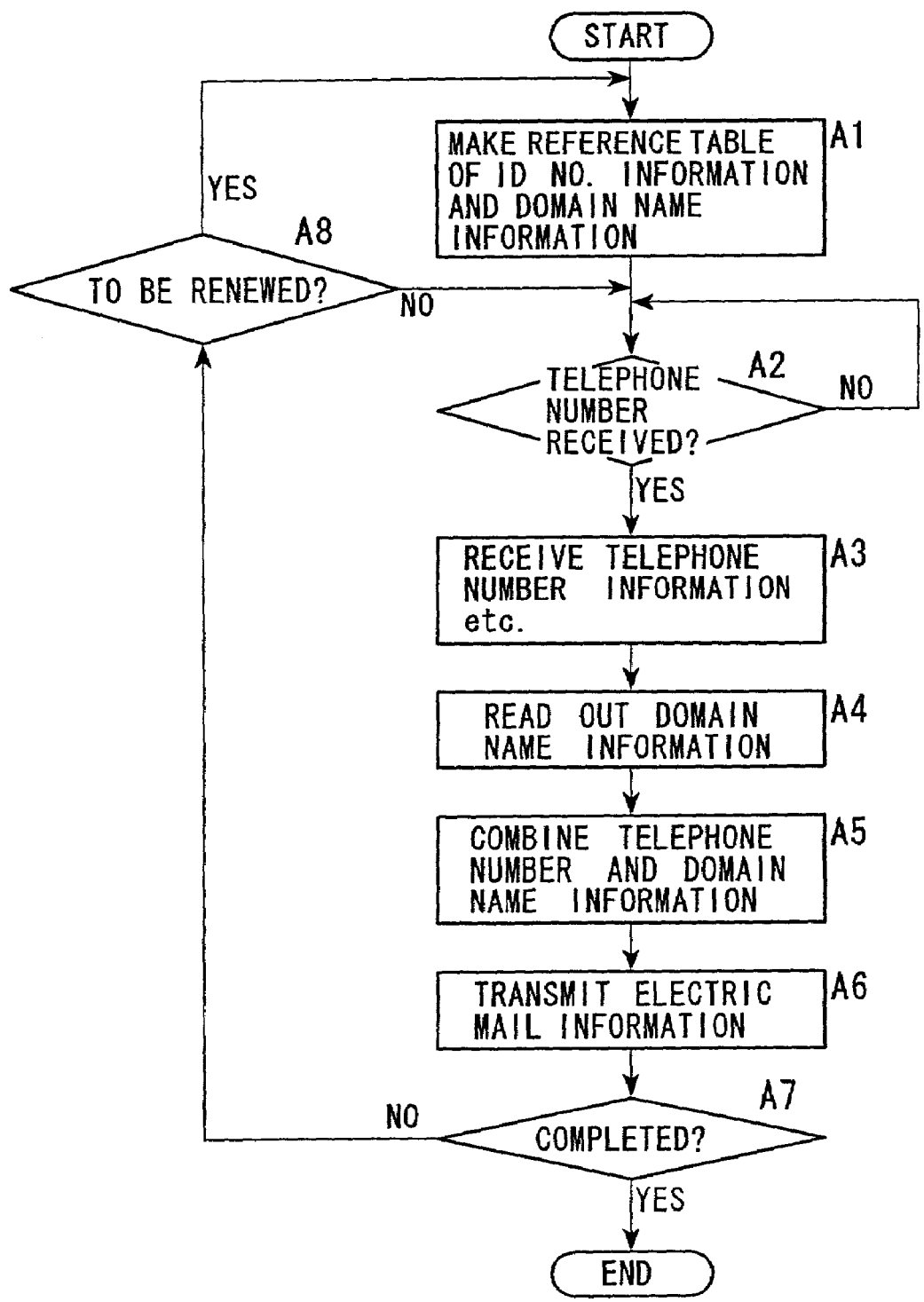
FIG. 2 is a flowchart for showing a process example in the communication system 10.

The preferred embodiment of the communication method will be explained as follows. FIG. 2 is the flowchart to show a process example in the communication system 10.

The-system 10 premises situations where the electronic mail information is exchanged on the basis of the mail address D0 including the telephone number information D1 of the destination and the domain name information D2 of the telecommunication services operator. Further, the system 10 assumes situations where the telecommunication services operator provides a mail communication service which automatically establishes the mail address D0 on the basis of the telephone number information D1 of the destination.

In the above-mentioned case, the telecommunication services operator end at step A1 shown in FIG. 2 produces the reference table in which the identification number information D11 of the telecommunication services operator is corresponded to the domain name information D2 of the telecommunication services operator. The reference table produced hereby is stored in the storage device 2 connected to the communication management device Thereafter, when the mail communication service is established, then the user end can freely decide whether or not the electronic mail information should be transmitted. The telecommunication services operator end waits for reception of the telephone number information D1 from the user at step A2. When the user transmits the electronic mail information to the destination, the user inputs the electronic mail information to be transmitted to the destination and the telephone number information D1 including the identification number information D11 of the telecommunication services operator, into the communication device #i which the user owns.

In return, at step A3, the telecommunication services operator end receives the mail information contents and the telephone number information D1 from the communication device #1 of the user. At step A4, the communicating management device 1 reads out the domain name information D2 of the telecommunication services operator from the reference table stored in the storage device 2, using the identification number information D11 of the telecommunication services operator as an address. Thereafter, proceeding to the step A5, the communication management apparatus 1 combines the telephone number information D1 of the destination, which has been input, and the domain name information D2 read out from the reference table. Thereafter, the mail address D0 of the destination is established.

Then, at step A6, the communication management device 1 transmits the electronic mail information to the destination on the basis of the mail address D0. At step A7, the communication system 10 judges whether or not the mail communication service is completed. At this time, the telecommunication services operator judges it. When the mail communication service is to be continued, the process goes to step A8 in which whether or not the reference table has been changed is checked. If the reference table has not been changed, the process returns back to step A2. If the reference table has been changed, the process returns back to step A1, in which the changed domain name information D2 of the telecommunication services operator is rewritten, namely, the reference table is renewed. Thereafter, the process goes to step A2 in which reception of the telephone number information D1 from the user is awaited.

Thus, according to the communication system 10 relating to the present invention, when communicating electronic mail information on the basis of the mail address D0 including the telephone number information D1 of the destination and the domain name information D2 of the telecommunication services operator, the user does not need to input the domain name of the telecommunication services operator in addition to the telephone number D1 of the destination into the communication device #i different from a conventional manner. That's why the mail address D0 including a telephone number and a domain name can automatically be established at the telecommunication services operator side.

Therefore, the user can transmit the electronic mail information to the destination merely by inputting the telephone number information D1 including the identification number information D11 of the telecommunication services operator into the communication device #i. The inputting operability of the mail address D0 can be improved. The interface function of the communication device #i at the time when the user transmits an electronic mail can be improved.

(2) The First Embodiment

Figure 3:
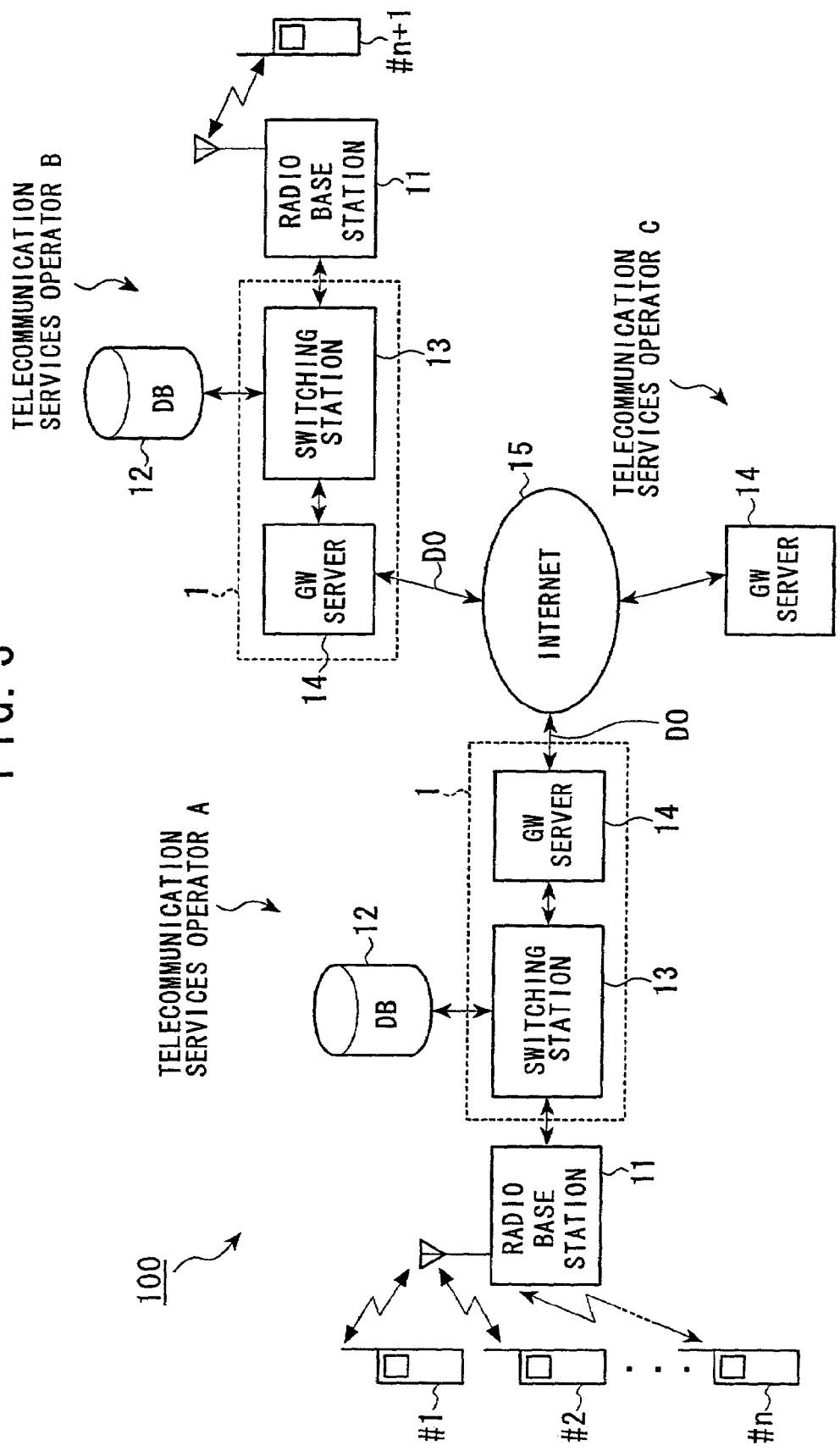
FIG. 3 is a block diagram for showing a configuration example of an electronic mail communication service system 100 as the first embodiment of this invention.

FIG. 3 is a block diagram to show a configuration example of an electronic mail communication service system 100 as a first embodiment of the present invention. In this embodiment, when transmitting an electronic mail from the portable telephone 101 being an example of a communication device of the present embodiment to a destination portable telephone 101, the system transmits the electronic mail information only using the telephone number information D1 (hereinafter simply referred to as "phone number D1") of the destination instead of the mail address D0 as performed in the conventional method.

The electronic mail communication service system 100 shown in FIG. 3 is an example of the communication system 10 described above. In this example, the portable telephone 101 as an example of the communication device #i is prepared at the user end, in which the phone number D1 is inputted including the identification number information D11 of the telecommunication services operator (hereinafter simply referred to as "operator code D11"). Simultaneously, the electronic mail information is transmitted to the destination on the basis of a regular mail address D0 established in the telecommunication services operator. The communication device #i may be replaced by a portable radio terminal and a personal computer, etc. instead of the portable telephone 101. As for the internal configuration model of portable telephone 101, refer to a second embodiment which will be described later.

In this example, the telecommunication services operator A contracts with portable telephones #1, #2, ... #n of the users and structures an individual mobile communication network. Further, the other telecommunication services operator B contracts with the portable telephones #n+1, ... of and structures the individual mobile communication network. Each of telecommunication services operators A and B includes a radiobase station 11, a communication management device 1 and a database 12. The radio base station 11 transmits and receives a radio wave to and from the portable telephone #i of the user and the like in a predetermined frequency bandwidth.

The communication management device 1 is connected to the radio base station 11 of the telecommunication services operators A and B. The mail address D0 of the destination of the electronic mail information is managed in the communication management device 1. The communication management device 1 includes a switching station 13 and a gateway server device (hereinafter, referred to as "GW server") 14.

The GW server 14 of the telecommunication services operator A is connected the other GW server 14 of the other telecommunication services operator B through the Internet 15 being an example of communication networks. The switching station 13 is connected to each of the radio base stations 11. The switching station 13 connect a communication line in accordance with the phone number D1 of the destination communication device #i so as to transmit the electronic mail information to the destination communication device #i.

The database 12 being an example of the storage device is connected to the switching station 13. The reference table in which the operator code D11 and domain name information (hereinafter, simply referred to as "domain name") D2 are corresponded to each other is stored in the database 12. The reference table is renewed every time the domain name D2 is changed in order not to burden the user of the portable telephone 101 with a renewal processing of the domain name D2.

The switching station 13 is managed to read out the domain name D2 of the telecommunication services operator B from the database 12, using the operator code D11 of the telecommunication services operator B, for example, which is received from the portable telephone #1 as an address. The switching station 13 automatically establishes the mail address D0 by combining the phone number D1 received from the portable telephone #1 and the domain name D2 read out from the database 12.

The GW server 14 is connected to the switching station 13, and also is connected to the Internet 15. In accordance with the mail address D0 comprised of the phone number D1 of the destination and the domain name D2 of the telecommunication services operator, the electronic mail information is transmitted and received through the Internet 15. Connecting points of each of the GW server 14 and the Internet 15 differ from each other, on the basis of the telecommunication services operators A and B. This is because each of the telecommunication services operators has an individual mobile communication network.

FIG. 4A and FIG. 4B show a telephone number system and a configuration example of the mail address D0 applied to the electronic mail communication service system 100.

In the telephone number system applied to the electronic mail communication service system 100 shown in FIG. 4A, first three digits indicate a service code "◯◯◯" for identifying a communication service, such as a cellular phone service, a personal handy phone service or the like. Middle three digits subsequent to the first three digits indicate an operator code "ΔΔΔ", which is an example of the operator code D11, for identifying a telecommunication services operator (hereinafter, referred to as "portable telephone services operator"). Last five digits indicate a subscriber's number for identifying each of subscribers of the portable telephone. All of these numbers are called "phone number D1" in the specification. Any of the numbers is input in Arabic numerals in the portable telephone #i of the user.

The mail address D0 is comprised of the above-described phone number D1 and an at-mark @ and the domain name D2, as shown in FIG. 4B. In the conventional way, the user must input the at-mark @ and the domain name D2 following it using Roman characters (alphabets) and the like. However, in the present embodiment, input of all of the at-mark @ and the domain name D2 can be omitted.

FIG. 5 shows an example of contents of a domain name reference table applicable in domestic use and in global use. In the present embodiment, a domain name reference table in which the operator codes D11 of the portable telephone services operators, country codes and the domain names D2 of the portable telephone services operators are respectively corresponded is prepared in advance. For example, the database 12 connected to the switching station 13 as explained with reference to FIG. 3 stores a domain name reference table to which the country codes are applied.

The country codes are used at the time of transmitting electronic mail information abroad using only the phone number D1. Because with regard to the mail transmission abroad, the telecommunication services operator cannot be specified only with the operator code D11. In the present embodiment, first, the portable telephone services operator is specified by corresponding the country code and the operator code D11, and then, the domain name D2 is corresponded thereto. In this case, the mail address D0 includes a system of a country code+telephone number+@domain name.

Therefore, the service code in the first portion of the destination phone number D1 showed in FIG. 4A is eliminated, and instead thereto, a country code is inserted. When a user transmits an electronic mail to overseas from portable telephone #1, the switching station 13 of the portable telephone services operator combines a country code, a phone number D1 and a domain name peculiar to a portable telephone services operator of the destination so as to form a mail address D0. With regard to electronic mails from overseas to our country, by specifying a portable telephone services operator in our country using the country code and the phone number D1 of the destination, a domain name peculiar to the portable telephone services operator can be found out.

This domain name reference table is formed in a table format. According to this example, e.g. a country code "81" for identifying Japan is described for an operator code D11="345". A domain name of "@aaa.bbbb.ne.jp." is described as a corresponding domain name D2. A country code "1" for identifying any other country is described for the operator code D11="798", a domain name "@ xxx-.aaaa.ne.jp" is described for a corresponding domain name D2.

Likewise, a country code "81" is described for the operator code D11="123". A domain name "@yyy.zzzz.ne.jp." is described for a corresponding domain name D2. Thereby using the country code, even in a case of transmitting an electronic mail to overseas, electronic mail information can be transmitted merely by the phone number D1 of the destination. Additionally, when a user transmits and receives an electronic mail in domestic, such a country code may be omitted.

Figure 6:
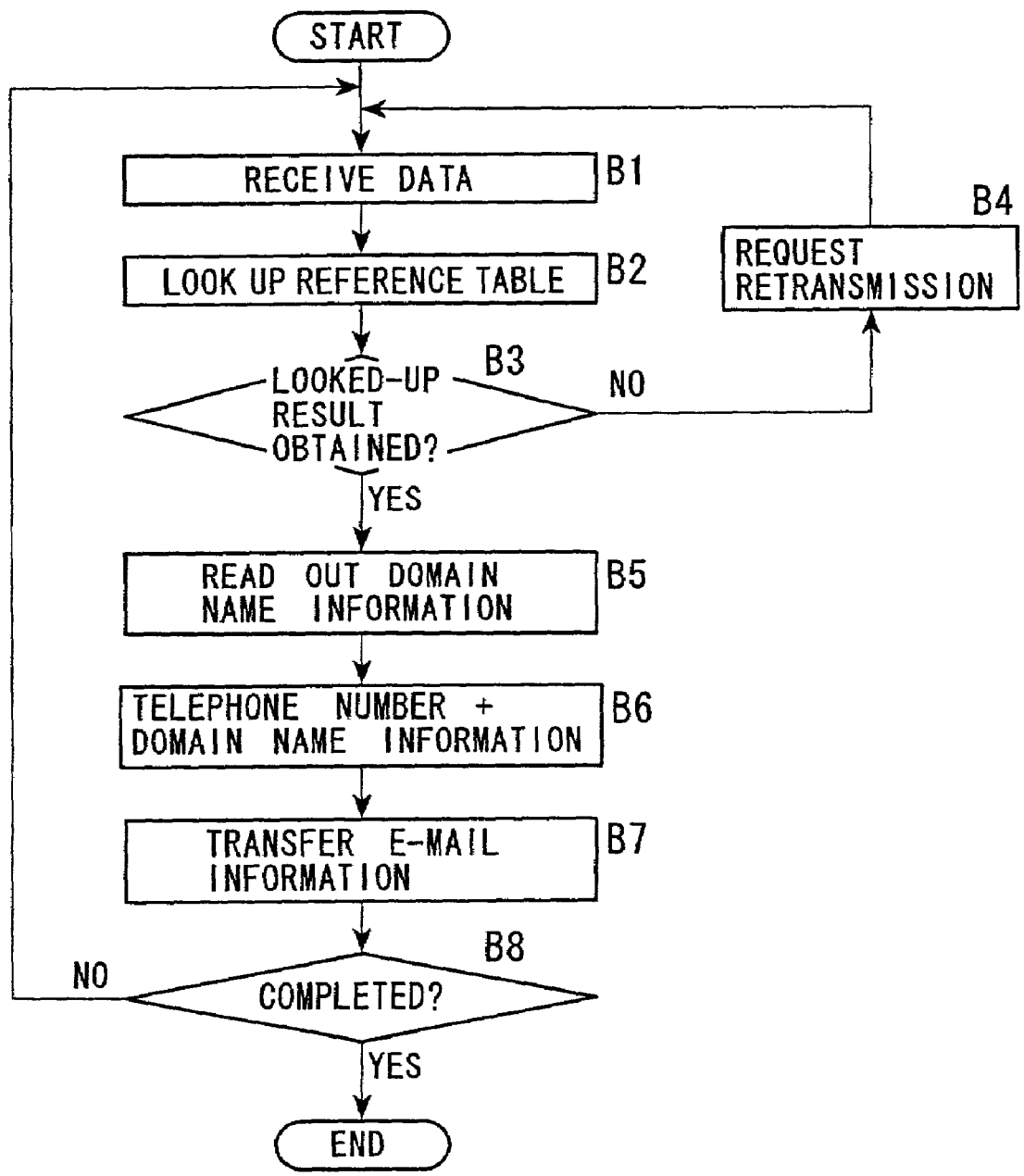
FIG. 6 is a flowchart for showing a process example in a GW (gateway) server 14 of a telecommunication services operator.

Further, an example of process in the GW server 14 in the electronic mail communication service system 100 will be explained. FIG. 6 is a flowchart showing a process example in the GW server 14 of a portable telephone services operator.

In this example, a mail address D0 is beforehand produced at the portable telephone services operator end. Further, the latest domain name table is provided. Here, a case where a corresponding domain name D2 always exists, is assumed. In a case where there is no corresponding domain name D2 in the domain name reference table, it is directed to a case where a portable telephone user incorrectly inputted it. In such a case of an input mistake, a portable telephone services operator transmits retransmission request to a portable telephone #i.

In accordance with the above-mentioned situation, the phone number D1 of the destination and a content of electronic mail information are transmitted from the portable telephone #i to the radio base station 11. In return, the GW server 14 receives electronic mail information and the telephone number D1 by way of the switching section 13 at step B1 in flowchart shown in FIG. 6. Further, at step B2, the GW server 14 refers a domain name D2 in the database 12 connected to the switching section 13 on the basis of the operator code D11 included in the phone number D1. Further, at step B3, if there exists the domain name D2 of the corresponding operator code D11 of the destination by a reference result, the process goes to the step B5.

When there is not any domain name D2 of the operator code D11 of a corresponding destination by the reference result at the step B3, there is a high possibility that the portable telephone user made an input mistake. Therefore, after shifting to step B4, the GW server 14 requests retransmission of the phone number D1 to the transmission source. In return, the phone number D1 except for an electronic mail information content is again input in the portable telephone #i of the user.

At step B5, the GW server 14 reads out the domain name D2 of the destination portable telephone services operator through the switching section 13 using the operator code D11 as an address. Proceeding to step B6, the GW server 14 combines the domain name D2 read out from the reference table and the telephone number D1 of the destination previously-input, and establishes the mail address D0 of the destination to be transmitted. Proceeding to step B7, the GW server 14 transfers the electronic mail information to the destination on the basis of the mail address D0 through the Internet 15.

The GW server 14 of the destination portable telephone services operator finds out a subscriber's number of the portable telephone #i of the destination user in accordance with the mail address D0. An electronic mail is transferred to the destination portable telephone #i through the switching section 13 and the radio base station 11. At step B8, the electronic mail communication service system 100 judges whether or not the mail communication service is completed. The portable telephone services operator decides this judgement. When the mail communication service is to be continued, the process goes back to step B1, reception of electronic mail information and the phone number D1 of the destination from the user is awaited.

According to the electronic mail communication service system 100 as the first embodiment relating to the present invention, following effect is provided. In a case where electronic mail information is exchanged in accordance with the mail address D0 including the phone number D1 of the destination and the domain name D2 of the portable telephone services operator, the user does not have to input the domain name D2 of the portable telephone services operator into the portable telephone #i in addition to the phone number D1 of the destination, different from such as in a conventional system. Namely, the mail address D0 including the phone number D1 and the domain name D2 can automatically be established using the GW server 14 at the portable telephone services operator.

Therefore, if only the user inputs the phone number D1 including the operator code D11 into the portable telephone #i, the electronic mail information can be transmitted to the destination. Operability for inputting the mail address D0 in the electronic mail communication service system 100 can be improved. Further, an interface function of portable telephone #i in a user at a time when an electronic mail is transmitted can be improved.

Further, even in a case of an electronic mail from overseas, an electronic mail can be transmitted only using the phone number D1 of the destination with the country code. Additionally, regardless of existence of the operator code D11, if there is any number which can specify the domain name D2 in the destination phone number D1, the number also can be utilized.

(3) The Second Embodiment

Figure 7:
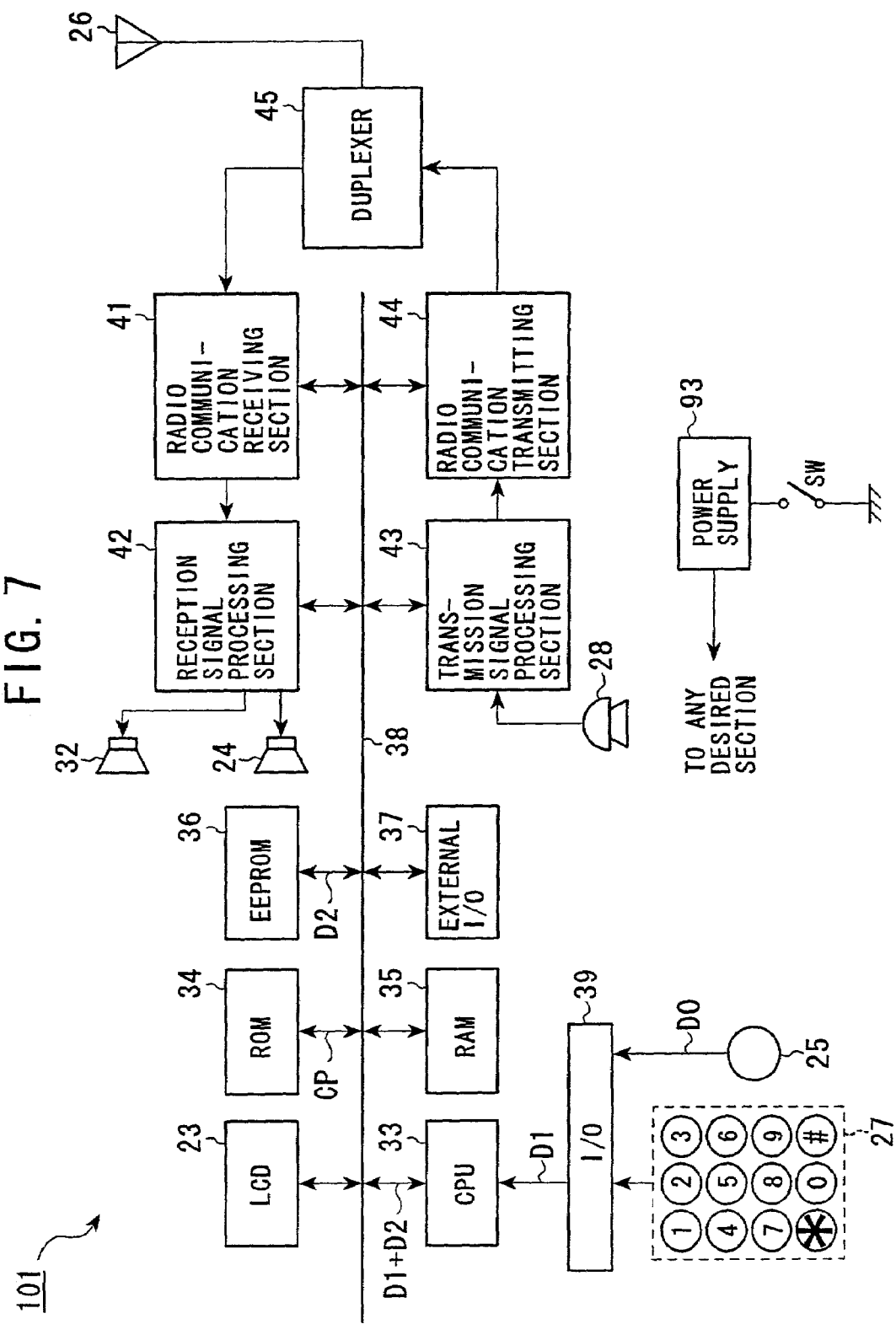
FIG. 7 is a block diagram for showing an internal configuration example of a portable telephone 101 as a second embodiment of the present invention.

FIG. 7 is a block diagram showing an internal configuration example of the portable telephone 101 as the second embodiment. In the second embodiment, the domain reference table function as explained in the first embodiment is provided in the portable telephone #i.

When electronic mail information is transmitted on the basis of the mail address D0, the portable telephone 101 as shown in FIG. 7 is provided with a controller which uses the operator code D11 of a portable telephone services operator as an address, and reads out the domain name D2 of the portable telephone services operator from a nonvolatile storage device (memory) in the portable telephone 101. The controller combines the phone number D1 of the destination input by the user and the domain name D2 read out from the storage device, thereby establishing the mail address D0. Thereby, even when the user does not have to input the domain name D2 of the portable telephone services operator in addition to the phone number D1 of the destination, which is different from the one as in a conventional system, the mail address D0 comprised of the phone number D1 and the domain name D2 can automatically be structured. If only the phone number D1 including the operator code D11 is input, electronic mail information can be transmitted to the destination.

The portable telephone 101 shown in FIG. 7 exchanges electronic mail information with other portable telephones, on the basis of the mail address D0 including the phone number D1 of the destination and the domain name D2 of the portable telephone services operator. The portable telephone 101 has a CPU 33 being an example of the controller, which executes a mail address auto-establishing mode and a table auto-rewriting mode.

Here, a term "mail address auto-establishing mode" is defined to be a mode for automatically establishing the mail address D0 by combining the phone number D1 of the destination input by the user and the domain name D2 read out from the storage device. Further, a term "a table auto-rewriting mode" is defined to be a mode for automatically renewing the domain name D2 of the portable telephone services operator stored in a memory being the storage device, which is activated by the portable telephone services operator. The domain name D2 is renewed at any time regardless of the user's intention. The user has only to leave the portable telephone 101 in a standby-mode.

An internal bus 38 is connected to the CPU 33. The internal bus 38 is connected to a radio communication reception section 41 having a radio telephone function, a reception signal processing section 42, a transmission signal processing section 43 and a radio communication transmission section 44 and the like. The radio communication reception section 41 and the radio communication transmission section 44 are respectively connected to an antenna 26 by way of a duplexer 45.

After the duplexer 45 separates a the radio wave received by the antenna 26 into a transmission signal and a reception signal, the radio communication reception section 41 selects only the reception signal having a predetermined carrier frequency. The reception signal is amplified at a high frequency using a low noise amplifier and the like. A reception signal after the amplification is mixed with a signal of local oscillation frequency, and a reception signal having intermediate frequency is separated from this mixed signal. After the reception signal is amplified by an intermediate amplifier, a quadrature demodulation signal processing is performed. The reception signal after the quadrature demodulation signal processing is A/D-converted, resulting in obtaining digital reception information.

After a control message and audio compression information are demodulated from the digital reception information, error correction is performed. The control message is output to the CPU 33. The audio compression information is output from the radio communication reception section 41 to the reception signal processing section 42. The reception signal processing section 42 demodulates and expands the audio compression information. The expanded audio information is D/A-converted and thereafter amplified to be outputted from a speaker 24 used for a receiver. The reception signal processing section 42 is connected to a-speaker 32 used on a rear side. The speaker 32 may generate an onomatopoeia sound such as "Pi, Pi, Pi, . . . " as a reception alarm when receiving the signal.

Further, the transmission signal processing section 43 is connected to a microphone 28. Thereby, after the audio signal of his/her own is amplified, the signal is A/D-converted. The sound information after the conversion is encoded and compressed. The encoded audio compression information is outputted from the transmission signal processing section 43 to the radio communication transmission section 44. The radio communication transmission section 44 combines the control message from the CPU 33 and the audio compression information. Further an error correction code is added thereto. Furthermore, transmission information after the code addition is modulated. Transmission information after the modulation is D/A-converted. The transmission signal after the conversion is amplified, after it was converted into a transmission signal having an intermediate frequency. A signal having a carrier frequency is modulated using the transmission signal after the amplification and the electronic power is amplified. Thereafter, the signal having the carrier frequency is radiated from the antenna 26 to the radio base station 11.

Further, an I/O interface section 39 is connected to the CPU 33. Additionally, an operation button 25 and a key array 27 being an example of an input unit are connected to I/O interface section 39. The operation button 25 is operated, e.g., when electronic mail information is transmitted. The key array 27 is operated when communicating the electronic mail, when the phone number D1 including the operator code D11 (only destination telephone number in the present invention system), a title and character information are input into the CPU 33.

Further, an EEPROM 36 (a read only memory in which writing and deletion of information are possible electrically) of an example of the storage device is connected to the internal bus 38. The domain name reference table in which the operator code D11 is corresponded to the domain name D2 of the portable telephone services operator is stored into this EEPROM. The domain name reference table is sold, equipped in a body of a portable telephone 101.

Therefore, the user does not have to input the domain name D2 put after an at-mark symbol "@", each time when a user transmits an electronic mail. The phone number D1 of the destination such as abbreviated dialing number and electronic mail subscriber information are stored in the EEPROM 36. However, the user's trouble can be omitted that any domain name D2 following after at-mark-symbol @ needs to be registered, even when an abbreviation registration function of a well-known phone number D1 is utilized. Additionally, a control program for executing the auto-establishing mode for the mail address D0 and a table auto-rewriting mode can be stored in the EEPROM 36.

The CPU 33 uses the operator code D11 of a portable telephone services operator input using the operation button 25, the key array 27 or the like, as an address, and the domain name D2 of the portable telephone services operator is read out from the EEPROM 36. The CPU 33 combines the domain name D2 which is read out from the EEPROM 36 and the phone number D1 of the destination input by the key array 27 to establish the mail address D0.

Further, a ROM 34 is connected to the internal bus 38. Each of control programs CP for controlling the entire portable telephone 101 is stored. The control program CP is directed to control of display of liquid crystal display (LCD) 23 (which will be later described), procedure of control of transmission processing using a modem such as the transmission signal processing section 43 and the radio communication transmission section 44 or the like, and procedure of control of reception using a communication modem of the reception signal processing section 41 and the reception signal processing section 42 or the like. The EEPROM 36 can be used for storage of control program CP in addition to the ROM 34. That is why rewriting of control program CP becomes possible in version-up.

The mail address auto-establishing mode is activated in response to the operation button 25 being pressed when transmitting an electronic mail under instructions of the CPU 33. The control program CP is read out from the ROM 34. And a mail address auto-establishing process is performed, depending on the control program CP. A table auto-rewriting mode is activated by a portable telephone services operator. A portable telephone itself in a standby mode is activated after the table auto-rewriting mode is called out by the radio base station 11. The communication control is performed, using a communication modem such as the transmission signal processing section 43 and the radio communication transmission section 44. The term "standby mode" is defined to be a status where a system LSI such as the CPU 33 of the portable telephone 101 and the LCD 23 lies in saving of an electronic power supply except for a clock function.

Further, the liquid crystal display 23, a RAM 35 and an external I/O interface 37 are connected to the internal bus 38. The liquid crystal display 23 displays onto a screen thereof, the telephone number D1 of a destination and/or a sender, an electronic mail which has reached from a destination, a content of character information relating to an electronic mail which is to be transmitted to the destination, according to the control program CP.

The RAM 35 is used as a working memory. The character information such as a control message by the radio communication reception section 41 or electronic mail information in absence of user is temporarily stored. A domain name reference table can be stored in the RAM 35 instead of the EEPROM 36. In such a case, a RAM with a backup electric power supply is used.

As mentioned above, the external I/O interface 37 is connected to the internal bus 38. Information processing using an unshown external personal computer and an external IC card, and a communication modem can be extended by way of a USB terminal for an unshown external device. Such a configuration is convenient when rewriting a control program of a mail address auto-establishing transmission mode and a table auto-rewriting mode and the like. Naturally, a power supply unit 93 is connected to these function process circuits. A power switch SW must always be on when the table auto-rewriting mode is executed. The portable telephone 101 enters a standby mode by on-operation of the electric power supply.

Figure 8:
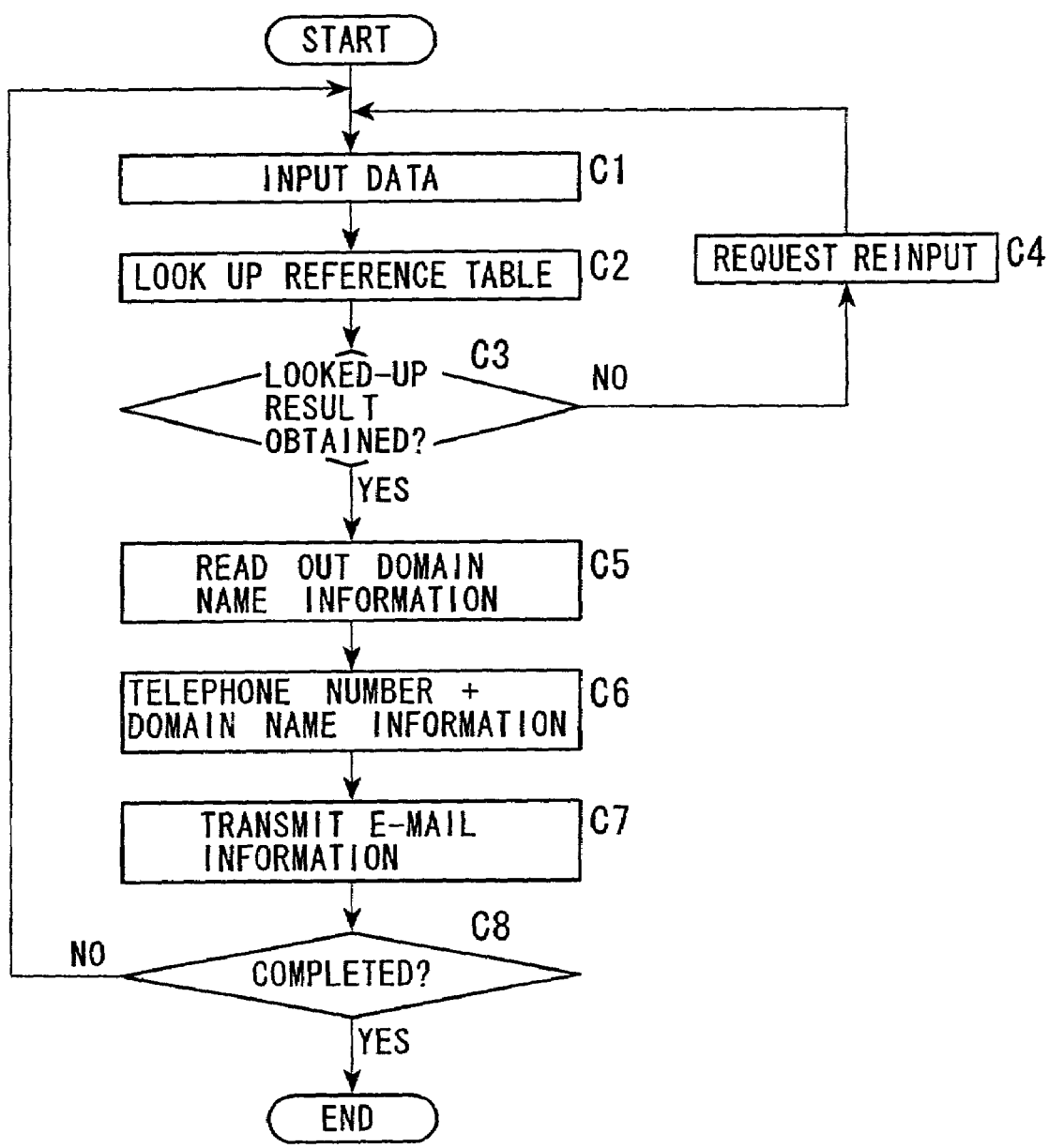
FIG. 8 is a flowchart for showing a process example of sending an electronic mail in the portable telephone 101.

A process example when transmitting an electronic mail in the portable telephone 101 will be explained. FIG. 8 is a flowchart for showing an example of process when transmitting the electronic mail in the portable telephone 101.

A case where a mail address D0 is established on the portable telephone side is premised in this example. Here, the portable telephone services operator updates the domain name reference table to be the latest one. The corresponding domain name D2 always lies in the domain name reference table. A case where there is not corresponding domain name D2 in the domain name reference table is considered to be a case where a portable telephone user incorrectly inputs the domain name. A re-input request is displayed on the liquid crystal display monitor 23 in the portable telephone 101 in a case of such incorrect input.

On the presumption above, the user uses the key array 27 at step C1 of the flowchart shown in FIG. 6. The user inputs the telephone number D1 of the destination and a content of electronic mail information to be transmitted to the destination are input into the portable telephone 101. After inputting of information is completed, the operation button 25 is pressed down so that the user can decide the electronic mail transmission. At step C2, the domain name D2 in the EEPROM 36 connected to the internal bus 38 is referred on the basis of the operator code D11 included in the phone number D1 in the CPU 33. If there is the domain name D2 of the corresponding destination operator code D11 by a reference result at step C3, then the present procedure advances to step C5.

When there is not any domain name D2 of the corresponding destination operator code D11 in the reference result at the step C3, there is a high possibility that the user of the portable telephone made an input mistake. Accordingly, the present procedure advances from step C3 to step C4 and re-input of the phone number D1 is requested for the user by the CPU 33. For the re-input request, a message such as "the domain name D2 of the destination portable telephone services operator of the destination is not found" is displayed on the LCD monitor 23. In return, the user is instructed to re-input the telephone number D1 except for the electronic mail information content.

At step 5, the CPU 33 uses the operator code D11 as an address and makes the EEPROM 36 store the address.

The domain name D2 of the destination portable telephone services operation is read from the domain name reference table. Thereafter, the present procedure advances from step C5 to step C6. The CPU 33 combines the destination telephone number D1 input first and the domain name D2 read out from the reference table. Thereby, the destination mail address D0 is established. Thereafter, the present procedure advances from step C6 to step C7. The CPU 33 converts the mail address D0 and the electronic mail information into a signal through the transmission signal processing section 43 and the radio communication transmission section 44. And the signal is transmitted to the radio base station 11 by way of the duplexer 45 and the antenna 26.

Thereafter, as explained in the first embodiment, the signal is transferred to the destination through a communication network such as the Internet 15 by a portable telephone services operator. In the GW server 14, a subscriber number of the portable telephone 101 of the destination user is found on the basis the mail address D0. The electronic mail is transferred to the destination portable telephone 101 by way of the switching station 13 and the radio base station 11.

Further, at step C8, the portable telephone 101 of the sender judges whether or not an electronic mail transmission is completed by the user. When the electronic mail transmission is to be continued, the present procedure returns to the step C1. A further input of electronic mail information from the user and a telephone number D1 of a destination is awaited.

Thus, in the portable telephone 101 of the second embodiment of the present invention, based on the mail address D0 including the phone number D1 of the destination and the domain name D2 of the portable telephone services operator, the EEPROM 36 in which the reference table is stored in which the operator code D11 is corresponded to the domain name D2 of the portable telephone services operator is beforehand embedded.

Therefore, being different from the conventional manner, the user does not have to input the domain name D2 of the portable telephone services operator in addition to the phone number D1 of the destination. Namely, the CPU 33 automatically establishes the mail address D0 by combining the phone number D1 of the destination input by the user and the domain name D2 read out from the EEPROM 36. Thereby, the user has only to input the phone number D1 including the operator code D11 of the portable telephone services operator when the user transmits electronic mail information to the destination. Inputting operability in electronic mail transmission in the portable telephone 101 can be improved.

Additionally, a portable telephone 101 obtained by removing the domain reference table function from the mobile telephone 101 applied in the second embodiment is further used as the portable telephone #i or the like of the first embodiment. Of course, the portable telephone 101 having a reference domain table function with the portable telephone #i or the like of the first embodiment may coexist. For a transition period when the electronic mail communication service system 100 can sufficiently be integrated by one of the two above-mentioned systems, the above-mentioned portable telephone 101 can efficiently be available.

Figure 9:
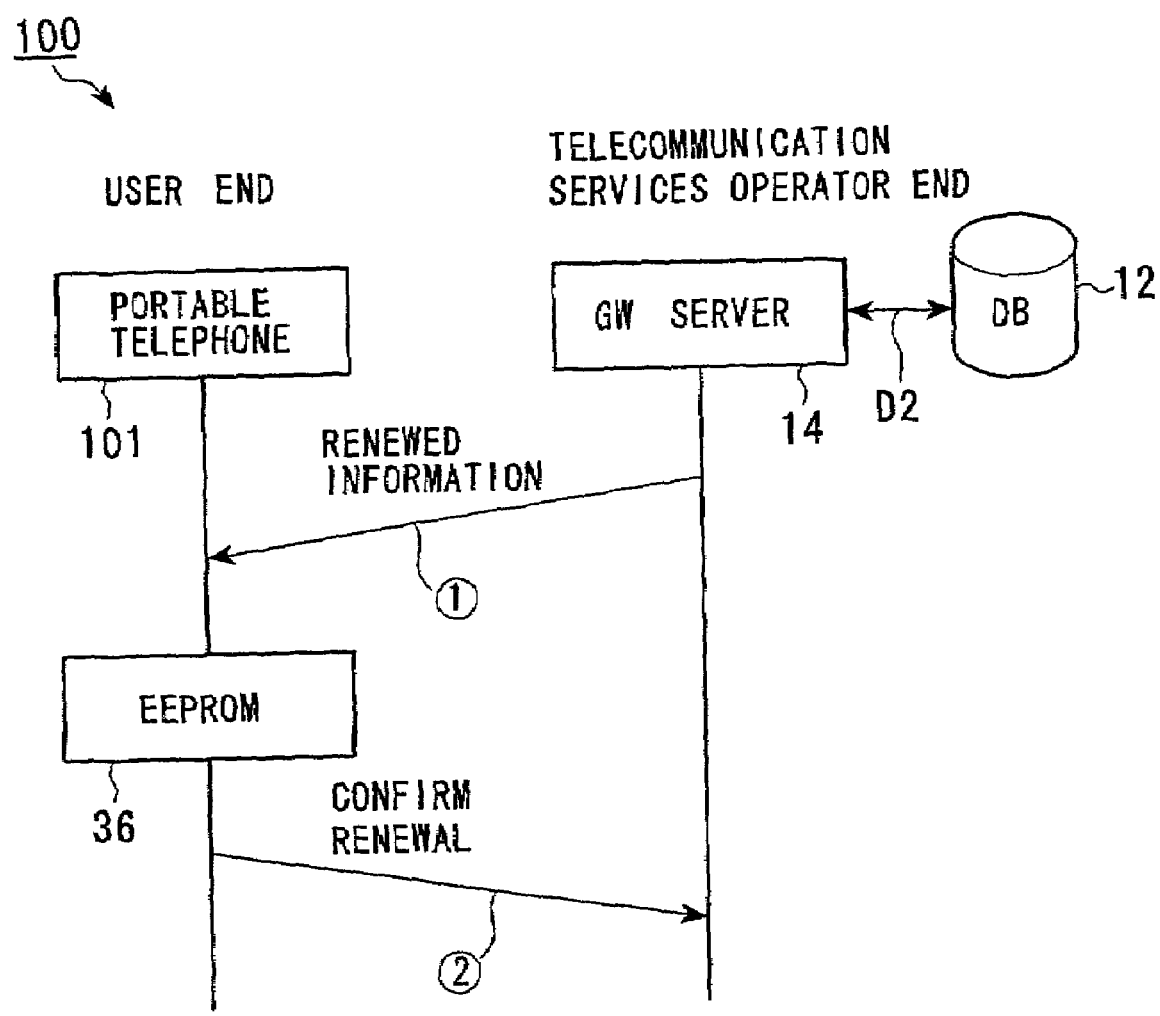
FIG. 9 is a chart for showing line connecting example in renewal of a domain name D2 (between a telecommunication services operator and a user)
Figure 10:
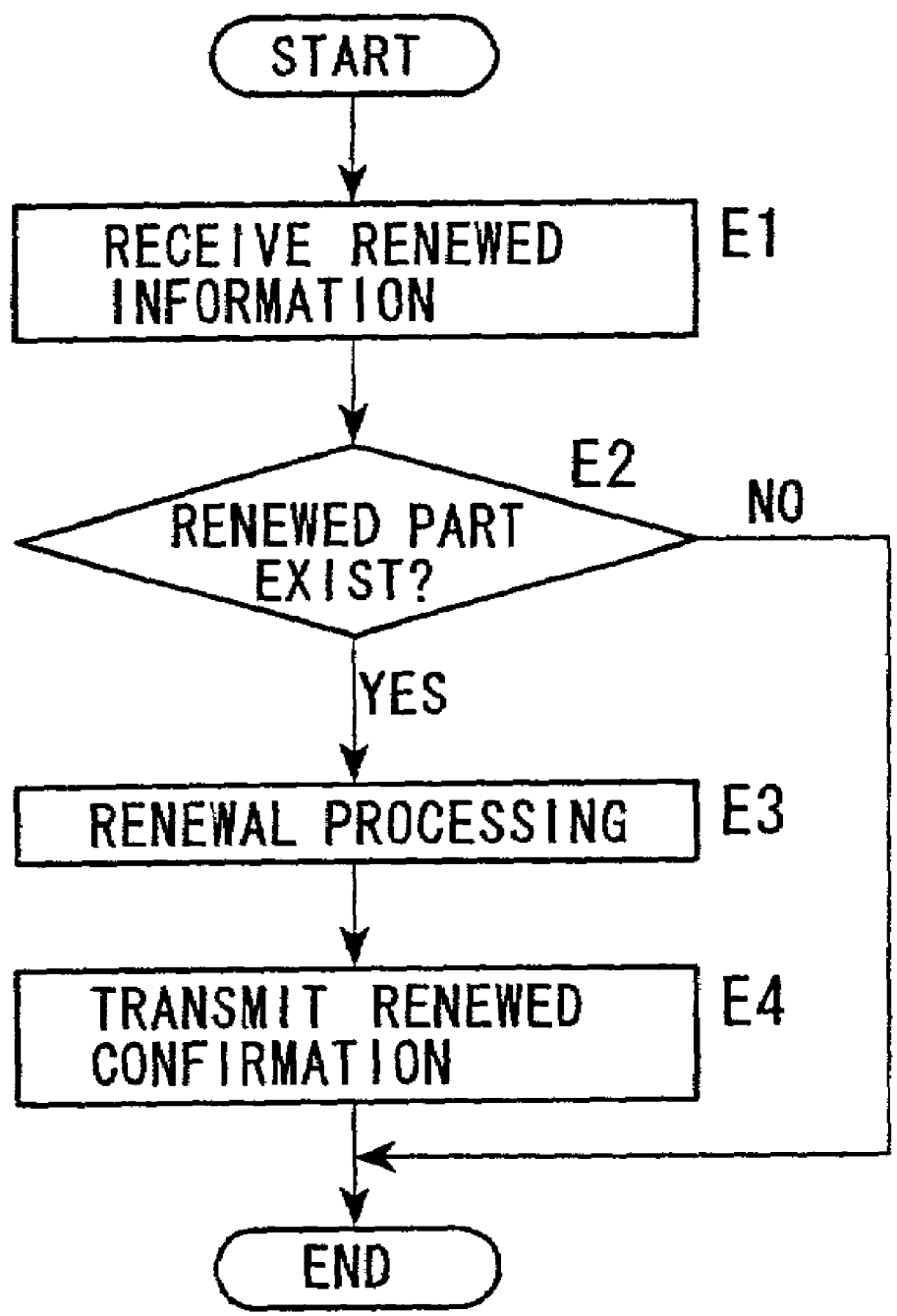
FIG. 10 is a flowchart for showing an example of renewal of a domain name reference table.

(4) A renewal (rewriting) example of a domain name reference table:

FIG. 9 is a chart showing line connecting example in renewal of the domain name D2 relating to each embodiment (between a portable telephone services operator and a user). FIG. 10 is a flowchart to show a renewal example of a reference domain name table in the portable telephone 101. In this example, a case is premised where the domain name D2 of each portable telephone services operator is registered in the database 12 of the portable telephone services operator and accompanying with this domain name D2, the domain name reference table which the portable telephone has is renewed.

In the communication system 100 shown in FIG. 9, a line is periodically connected between the GW server 14 of the portable telephone services operator and the portable telephone 101 of the user. The renewal information is periodically transmitted from the portable telephone services operator to the portable telephone 101 of the user. In this example, the portable telephone services operator activates the portable telephone 101 being in a standby mode. The domain name D2 is at any time renewed without a user's intention (a table auto-rewriting mode).

For example, the GW server 14 renews the database 12 of the portable telephone services operator, when the domain name D2 of the portable telephone services operator is changed. Accompanying with alternation of the domain name D2 in this database 12, the renewal information is transferred from the GW server 14 of the portable telephone services operator to the portable telephone 101 of the user in the line connection ①.

At step E1 of flowchart to show in FIG. 10, the renewal information is received at the user side. The process goes to step E2 if the renewal information is received. The CPU 33 confirms a content of the domain name reference table to judge whether or not any renewed part exists.

For example, the CPU 33 distinguishes whether or not there is any renewed part in the domain name reference table by comparing the domain name D2 corresponding to the operator code D11 on the basis of post information with the domain name D2 corresponding to the operator code D11 before the renewal information. Therefore, when there is a renewed portion, the present procedure advances to step E3. The CPU 33 renews the domain name reference table in the EEPROM 36 on the basis of the renewal information.

When the reference table has already been renewed, the renewal information is canceled. In this way, rewriting of the reference domain name table can be completed. Thereafter, the procedure proceeds to step E4. The renewal confirmation is notified from the portable telephone 101 to the portable telephone services operator in the line connection ②. Thereby, the portable telephone 101 can transmit an electronic mail, using the domain name reference table which is always renewed to be the latest reference table by the portable telephone services operator.

Figure 11:
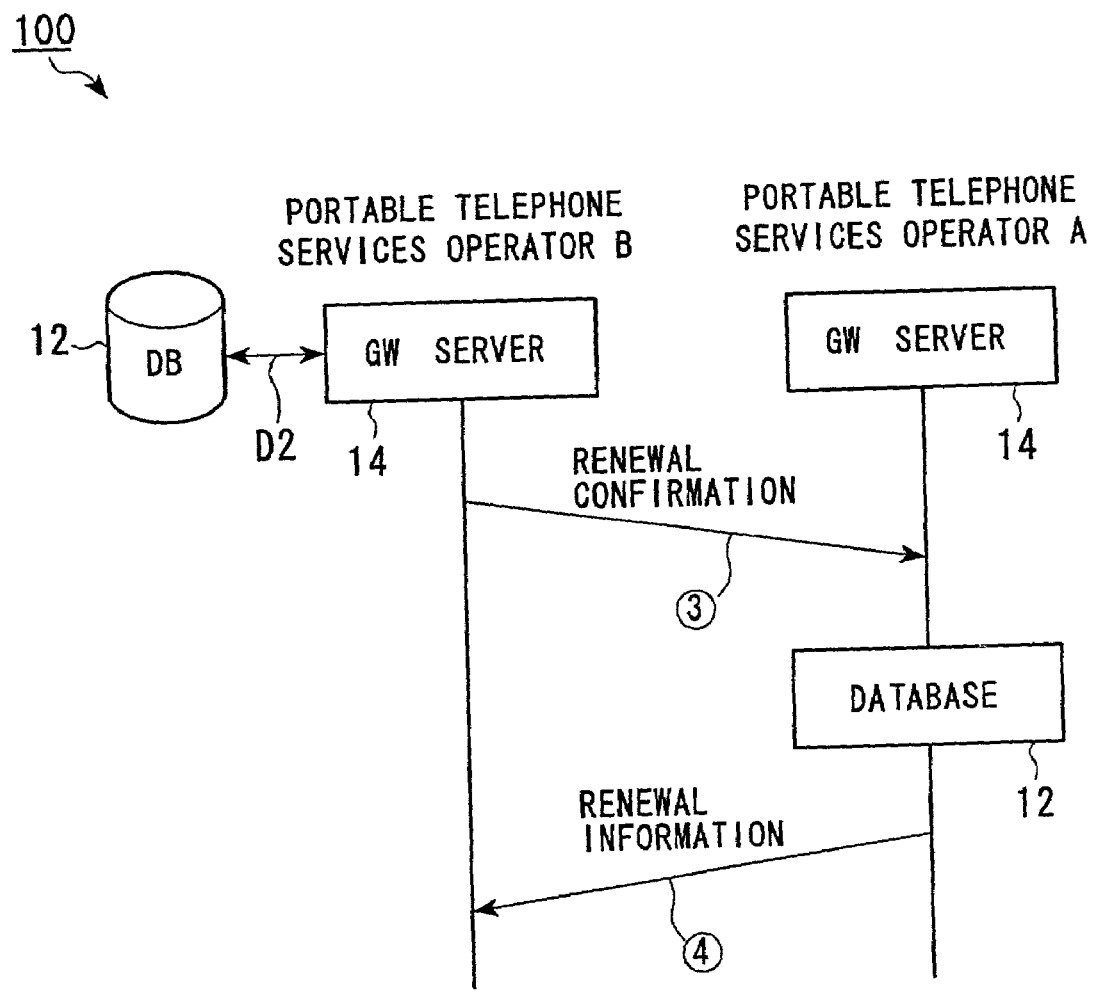
FIG. 11 is a chart for showing line connecting example in renewal of the domain name D2 (between telecommunication services operators).

FIG. 11 is a chart showing line-connecting example in renewal of the domain name D2 relating to each of embodiments (between portable telephone services operators).

The database 12 is provided for every portable telephone services operator in this example. The domain name D2 of each portable telephone services operator stored in the database 12 is automatically renewed at any time. Of course, a case is premised that domain names D2 of any other portable telephone services operators are registered in the database 12 of each portable telephone services operator.

When the domain name D2 in the corresponding portable telephone services operator is changed in the communication system 100 as shown in FIG. 11, a line is connected between a GW server 14 of a portable telephone services operator and a GW server 14 of the other portable telephone services operator. A fact of renewal is notified to the other portable telephone services operator so that the domain name reference table is renewed. In this example, renewal information may periodically be transmitted from the GW server 14 of one portable telephone services operator A to the GW server 14 of the other portable telephone services operator B.

For example, when the domain name D2 of the portable telephone services operator B has been changed, at first, the database 12 of the corresponding portable telephone services operator B is renewed using the GW server 14. Accompanying with the change of the domain name D2 in this database 12, the renewal information is transferred from the GW server 14 of the portable telephone services operator B to the GW server 14 of the other telephone services operator A using the line connection ③.

The renewal information is received at the other portable telephone services operator A end, and a content of a domain name reference table is checked. Then, the GW server 14 judges whether or not any renewed part exists in the reference table. For example, the GW server 14 distinguishes whether or not any renewed part exists, by comparing, the domain name D2 corresponding to the operator code D11 before the corresponding renewal, with the domain name D2 corresponding to the operator code D11 based on the renewal information. Therefore, when any renewed part exists, a domain name reference table in the database 12 is renewed on the basis of the renewal information using the GW server 14.

When the reference table has already been renewed, the renewal information is canceled. In this way, the rewriting process of the reference domain name table in the database 12 of the portable telephone services operator A can be completed. Thereafter, a renewal confirmation is notified from the portable telephone services operator A which has received the renewal information using the line connection ④ to the portable telephone services operator B which has requested the renewal. Therefore, an electronic mail can be transmitted using the domain name reference table which is always renewed in the portable telephone services operator A.

Thus, according to the example of renewal of the domain name D2 relating to each example, even when the mail address D0 (mainly, in the domain name D2) is changed by request from the portable telephone services operator B end, a user who contracts with the portable telephone services operator A may not by each time input the domain name D2 of the portable telephone services operator B in addition to the ephone number D1 of the destination as in the conventional way. Then the domain name D2 can be renewed between the portable telephone services operators. Further, an electronic mail user can transmit and receive an electronic mail only using the phone number D1 of the destination, so that usability of the portable telephone 101 can be improved. Inputting operability of the mail address D0 can be improved. An electronic mail information can be transmitted only using the phone number D1 of the destination.

Although the invention has been described in its preferred form with a certain degree of particularity, obviously many changes and variations are possible therein. It is therefore to be understood that the present invention may be practiced otherwise than as specifically described herein without departing from the scope and the sprit thereof. For example, in the above embodiments, examples using portable telephones are described. However, the present invention may be applied in communication using existing fixed telephone network as well.

What is claimed is:

1. A communication system for exchanging electronic mail information, said communication system comprising:
    a plurality of communication devices for inputting a telephone number that includes an identification number of a telecommunication services operator and for transmitting electronic mail information together with the telephone number;
    a storage device for storing a reference table in which the identification number of the telecommunication services operator is correlated with a domain name of the telecommunication services operator; wherein country information in addition to the identification number is correlated with the domain name in the reference table stored in the storage device; and
    a communication management device for receiving the transmitted electronic mail information and telephone number, of the for reading the domain name of the telecommunication services operator from the reference table using the identification number of the telecommunication services operator, for merging the telephone number with the domain name read from the reference table to form an electronic mail address, and for forwarding the electronic mail information to the electronic mail address;
    the electronic mail address having a local part and a domain part, the local part being separated from the domain part with an at mark symbol "@", the local part including the telephone number and the domain part includes the domain name of the telecommunication services operator.

2. The communication system according to claim 1, wherein the reference table is automatically updated with a new domain name of the telecommunication services operator at a desired time.

3. The communication system according to claim 1, wherein the communication management device of the telecommunication services operator is connected to a communication management device of another telecommunication services operator through a communication network and transmits the electronic mail information to one of the plurality of communication devices that is line-connected to the other telecommunication services operator.

4. A communication device comprising:
    an inputting unit for inputting a telephone number and that includes an identification number of a telecommunication services operator;
    a storage unit for storing a reference table in which the identification number of the telecommunication services operator is correlated to a domain name of the telecommunication services operator; wherein country information in addition to the identification number is correlated with the domain name in the reference table stored in the storage device; and
    a controller for reading the domain name of the telecommunication services operator from the reference table using the identification number of the telecommunication services operator, and for merging the telephone number with the domain name read from the reference table to form the electronic mail address;
    wherein the electronic mail address having a local part and a domain part, the local part being separated from the domain part with an at mark symbol "@", the local part including the telephone number, and the domain part including the domain name of the telecommunication services operator; a transmission unit for transmitting the electronic mail information and the electronic mail address.

5. The communication device according to claim 4, further comprising a rewriting mode for automatically updating the domain name of the telecommunication services operator stored in the reference table.

6. The communication apparatus according to claim 5, wherein the rewriting mode is activated at a desired time by the telecommunication services operator being updated.

7. A communication method of exchanging electronic mail information, said method comprising:
    producing, in a database, a reference table in which an identification number of a telecommunication services operator is correlated to a domain name of the telecommunication services operator;
    inputting a telephone number that includes the identification number of the telecommunication services operator into a communication device;

transmitting electronic mail information together with the telephone number from the communication device to a communication management device;

reading, from the database, the domain name of the telecommunication services operator from the reference table using the identification number of the telecommunication services operator;

merging, at a communication management device, the telephone number with the domain name read from the reference table to form an electronic mail address;

the electronic mail address having a local part and a domain part, the local part being separated from the domain part with an at mark symbol "@", the local part including the telephone number and the domain part including the domain name of the telecommunication services operator; and forwarding the electronic mail information from the communication management device to the electronic mail address.

8. The communication method according to claim 7, wherein the reference table is updated according to a change in the domain name information of the destination telecommunication services operator.

* * * * *

UNITED STATES PATENT AND TRADEMARK OFFICE
CERTIFICATE OF CORRECTION

PATENT NO. : 7,337,212 B2
APPLICATION NO. : 09/998116
DATED : February 26, 2008
INVENTOR(S) : Mitsuru Goto It is certified that error appears in the above-identified patent and that said Letters Patent is hereby corrected as shown below:

Column 5, line 59, "The-system" should read --The system--.

Column 12, line 6, "a-speaker" should read --a speaker--.

Column 17, line 63, after "number,", delete "of the".

Column 18, line 8, after "and", insert --,--.

Column 18, line 48, after "operator,", insert --and--.

Column 18, line 63, after "operator" and before ";", insert --wherein country information in addition to the identification number is correlated with the domain name in the reference table stored in the storage device--.

Signed and Sealed this

Ninth Day of February, 2010

David J. Kappos
*Director of the United States Patent and Trademark Office*